Dec. 6, 1966   J. B. HEWITT   3,289,664
KITCHEN UNIT

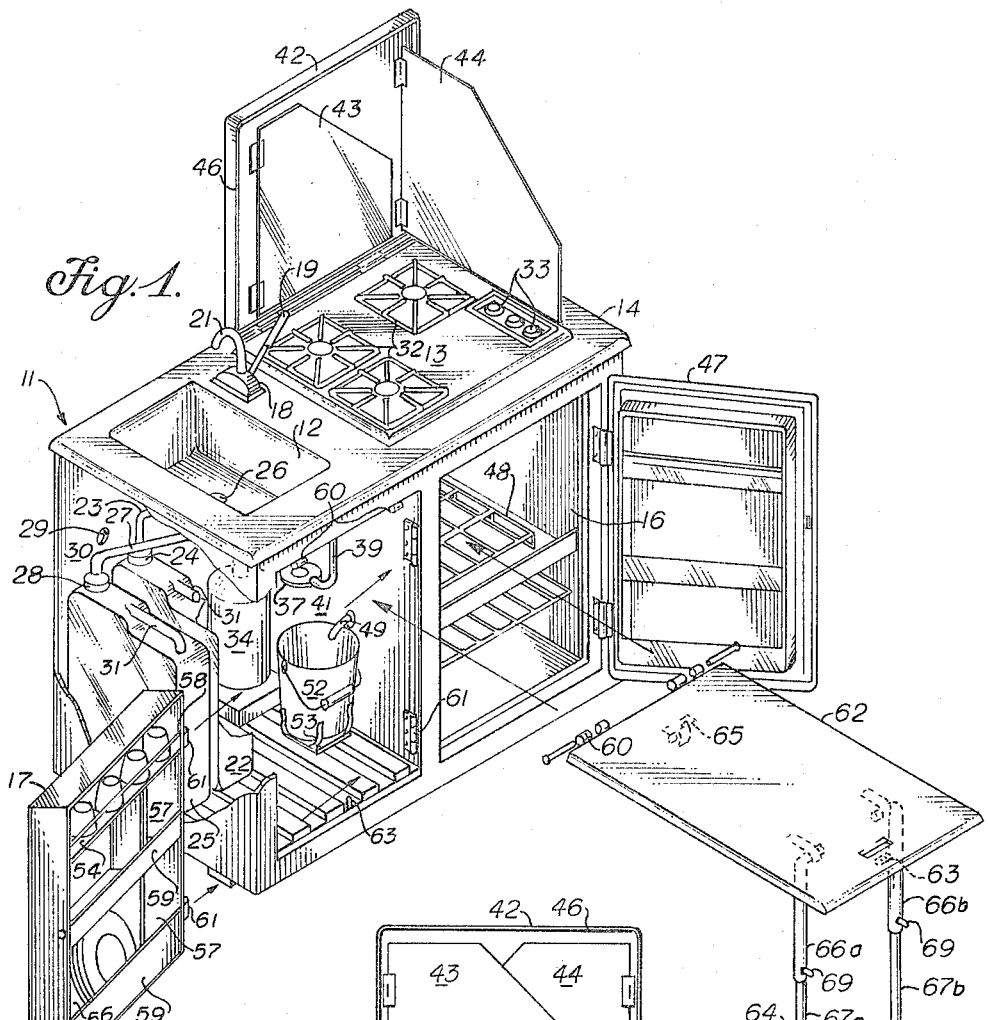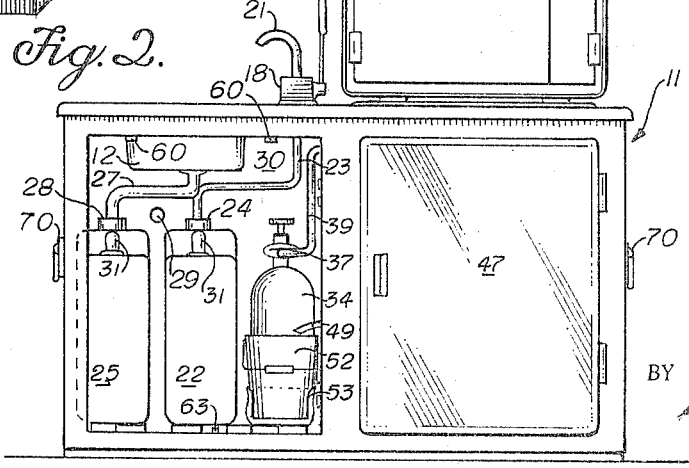

Filed Dec. 14, 1964   2 Sheets-Sheet 2

INVENTOR.
JAMES B. HEWITT
BY
AGENT

United States Patent Office 3,289,664
Patented Dec. 6, 1966

3,289,664
KITCHEN UNIT
James B. Hewitt, 5147 S. Front Road, Livermore, Calif.
Filed Dec. 14, 1964, Ser. No. 418,113
11 Claims. (Cl. 126—37)

The present invention relates to kitchen appliances, and more particularly, to a kitchen unit which includes the major appliances of the kitchen in one self-contained, compact and portable unit.

Due to the rapid industrial advance during this century, people are finding more leisure time to spend outdoors at recreational activities. However, these same people are now accustomed to having the many household conveniences and appliances that have resulted from the industrial advance, and, if they spend any length of time outdoors, miss them. Therefore, it can be seen that it is desirable that these household appliances be adapted for outdoor use.

The present invention combines the major appliances of the kitchen, including the sink, into one portable and self-contained unit which is adapted for such outdoor use. Each of these appliances is, as far as practical, as convenient to use as its counterpart in a home yet does not depend on external connections for use. Summarizing the invention, it comprises a cabinet which has a sink and a stove unit in its countertop, and either an oven or a refrigeration means, such as an icebox, in its body. A water supply tank within the cabinet communicates with a pump on the sink in order to supply water thereto. Desirably, the drain of the sink can be selectively connected to a waste water tank which is also within the cabinet or communicated with the exterior of the cabinet. A supply of a combustible gas, or other heat energy means, is within the cabinet and communicates with the stove in order to provide heat energy therefor. If an icebox is provided within the cabinet, means such as a bucket is also provided within the cabinet to catch water run-off from melting ice. If an oven is provided in the cabinet, it can be connected to the heat energy supply means for the stove, or a separate heat energy supply can be provided for it within the cabinet. The particular arrangement of the above elements as will be described enables the resulting unit to be portable and very compact.

From the preceding, it is seen that objects of the present invention, among others, are to provide an improved kitchen unit which is self-contained, which includes a sink, and which is compact and portable. Other objects and advantages of the invention will become apparent from the following more detailed description taken in conjunction with the attached drawings in which:

FIG. 1 is an isometric, partly exploded view of an advantageous embodiment of the kitchen unit of the invention with a portion thereof broken away to illustrate the construction of the unit;

FIG. 2 is an elevation view of the kitchen unit of FIG. 1 with a portion thereof removed.

Figure 3:
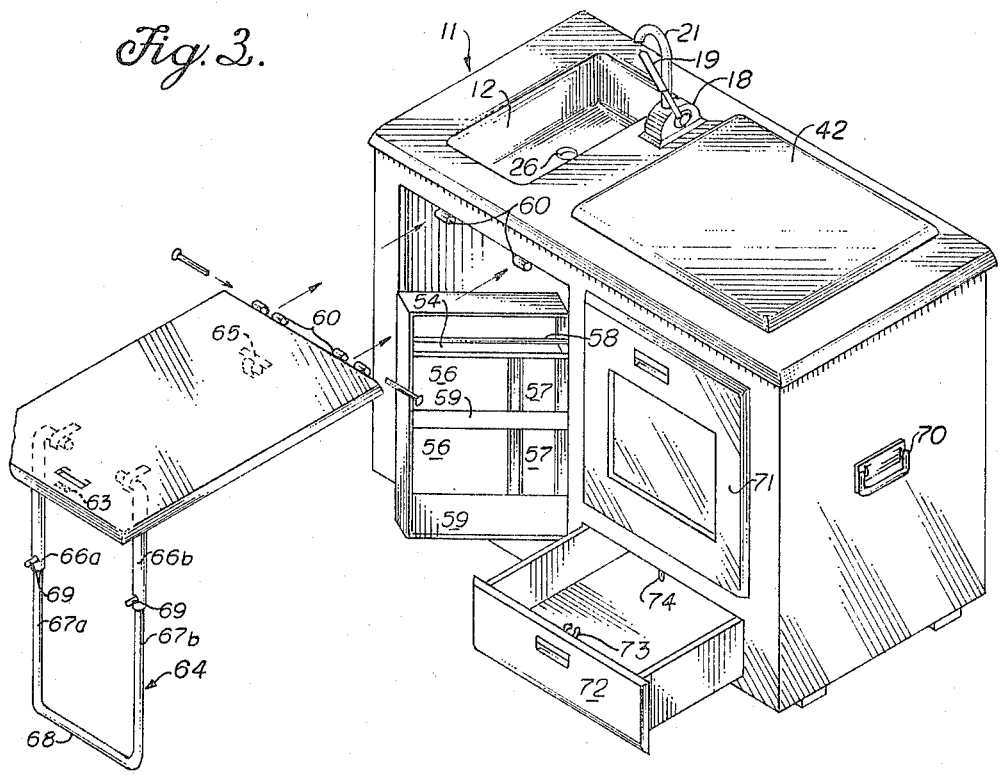
FIG. 3 is an isometric, partly exploded view of another embodiment of a kitchen unit of the invention.

The kitchen unit of the invention shown in FIGS. 1 and 2 generally comprises a rectangular cabinet 11 having a sink 12 and stove unit 13 in its countertop 14, and an icebox 16 and dish rack 17 within the cabinet. Desirably, countertop 14 is made of a light-weight moldable material such as Fiberglas, and for ease in construction the sink is molded into the countertop as an integral part thereof when it is made. A hand operated pump 18, such as of the rocker type, with handle 19 is provided on the countertop 14 adjacent the rear portion of the sink. A faucet nozzle 21 on the pump protrudes over sink 12 in order to provide water into the sink.

As most clearly seen in FIG. 2, a water supply tank 22 within cabinet 11 beneath sink 12 communicates with pump 18 by means of a conduit or hose 23. Hose 23 has a collar 24 which can be unscrewed from the tank 22 to disconnect the hose from the tank so that the tank can be removed from the cabinet for filling. It should be noted that hose 23 extends to the bottom of tank 22 so that pump 18 can remove all of the water from the tank.

A waste water tank 25 is also provided beneath the sink and communicates with the drain 26 of the sink through flexible conduit or hose 27. This hose is connected to the waste water tank by a collar 28 which, similarly to collar 24, can be unscrewed from the tank in order that the tank be removed from the cabinet. Flexible hose 27 is long enough to extend through opening 29 in the back wall 30 of the cabinet. Thus, when the release of waste water to the exterior of the cabinet will not matter, such as when the cabinet is being used outdoors, the hose can be extended through this opening 29. The waste water tank 25 can then be replaced with an auxiliary water supply tank or, alternatively, water supply tank 22 can be much larger. It is desirable that both the water supply tank and the waste water tank have handles 31 thereon for easy handling.

While not usually needed, brackets (not shown) can be provided on the interior sides or floor of the cabinet to hold the tanks stationary if the kitchen unit is to be used in some particularly unsteady environment such as on a small boat.

Stove unit 13 has three conventional gas burners 32 and a set of controls therefor 33. A gas tank 34, filled with a combustible gas such as butane is provided beneath the sink and is fitted within an aperture in a block rigidly mounted against the back wall of the cabinet. A gas regulator 37 for regulating the flow of gas from the tank is attached to the outlet of the gas tank 34, and a gas pipe 39 (partly shown) leads from the pressure regulator through the upper portion of inner wall 41 of the cabinet to the burner controls. From there, gas is distributed to the burners in a conventional manner.

The stove unit is provided with a combination cover and hood comprising a covering portion 42 hingedly connected to the rear edge of the stove unit, and two supporting sections 43 and 44 hingedly connected to the sides of the covering portion 42. When the stove is being used, the cover acts as a hood on three sides of the stove to prevent wind from interfering with the flame. That is, covering portion 42 protects the stove from the rear, and supporting sections 43 and 44 protect it from the sides when both are in the position in which section 44 is shown in FIG. 1. If the stove is not being used, the supporting sections can be swung inward flush against the covering portion as shown in FIG. 2 and the hood lowered to cover the stove unit. Besides protecting the stove unit, the hood or cover thereby provides a work counter next to the sink.

Covering portion 42 has a flange 46 about the periphery thereof that engages the countertop when the cover is in the closed position to prevent the cover from resting on burners 32. Preferably, covering portion 42 is one piece of molded plastic or Fiberglas. It is desirable, however, that supporting sections 43 and 44 be of a metal or other heat resistant material in order to protect the covering portion should the cover be mistakenly closed when a burner is on.

The icebox 16 has a door 47 hinged near the edge of the cabinet. An ice tray 48 is provided within the upper portion of the icebox to hold ice for cooling the icebox. A water drain-off tube 49 communicates with ice tray 48 and passes through the inner wall 41 of the cabinet and communicates with a bucket 52 beneath the sink. Bucket 52 fits within a bracket 53 that is rigidly mounted in the cabinet and is thus held in position beneath drain-off tube 49. While usually not necessary due to the small amount of water that will drain off into bucket 52, a lid (not shown) with an aperture to receive the drain-off tube can be provided for the bucket, if desired. In all other respects, icebox 16 is of a conventional type. Desirably, it is made of a light weight material such as plastic or Fiberglas.

Dish rack 17 includes a cup and glass tray 54, plate trays 56, and silverware trays 57. A rod 58 is provided across tray 54 to prevent cups and glasses from falling from the rack, and panels 59 are sufficiently high to hold in plates and silverware. While in FIG. 1, dish rack 17 is shown in an exploded position for illustrative purposes, it is actually hingedly connected by hinges 61 at a forward edge of one side thereof to the forward edge of cabinet inner wall 41. Thus, it can be seen that dish rack 17 can be swung completely outward to facilitate the removal of dishes and to provide access to the area beneath the sink.

A door 62, also shown in an exploded position, is hingedly connected by hinges 60 at its upper edge to the cabinet beneath sink 12 and when shut, is held by a catch 63 to close off the area beneath the sink. An expandable U-shaped leg 64 is pivotably connected to the interior surface of door 62 near its bottom edge, and a conventional spring catch 65 is provided on the door near its upper edge to hold the leg flush against the door. When the door is in an open position, leg 64 can be released from catch 65 and pivoted toward the ground to the position shown. In order to allow the door to be supported level with the ground by leg 64, such leg can be extended once it is released from catch 65. To this end, leg 64 comprises tubular arms 66a and 66b into which arms 67a and 67b of U-shaped base member 68 are telescoped. Buttons 69, one on each arm 67, are urged outward by springs (not shown) within such arms to engage corresponding holes in arms 66 when leg 64 is of a height to levelly support door 62. Thus, leg 64 can be readily extended by pulling outward on base member 68 after it has been released from catch 65 until buttons 69 engage the respective holes in arms 66. To collapse the leg, the buttons must be pushed inward to allow base member 68 to be telescoped into arms 66.

From the above, it can be seen that door 62 can be opened to a horizontal position and supported thereat for use as a work area or eating table.

It should be noted that when door 62 is closed, it rests against dish rack 17. This, coupled with the fact that the dish rack is hinged at a forward edge, prevents all movement of the dish rack with respect to cabinet 11, when such door is closed. That is, the door prevents forward swinging movement of the dish rack and the hinge of side of the rack abuts against cabinet inner wall 41 to prevent rearward swinging movement thereof. Handles 70, one on each end of cabinet 11, are provided to facilitate moving of the cabinet.

In one kitchen unit of FIGS. 1 and 2, cabinet 11 including countertop 12 and covering portion 42 is constructed of molded Fiberglas. Icebox 16, except for metal racks therein, is of plastic, and stove 13 and cover supporting sections 43 and 44 are of a metal alloy. The door 62 and dish rack 17 are of wood.

The cabinet has a height of 36 inches, depth of 23 inches, and a length of 42 inches. With such dimensions, the kitchen unit can fit in most station wagons, as well as truck campers. It has a dry weight of about ninety pounds and, therefore, is easily carried.

Another embodiment of the invention is shown in FIG. 3. In this embodiment, an oven 71 is provided in place of the refrigeration means. This oven is desirably a conventional gas oven, e.g., butane, and also receives its gas through a suitable conduit and gas regulator (not shown) from gas tank 34. However, it should be readily apparent that bucket 52 is not needed in this embodiment, and a separate gas tank for the oven can be provided under sink 12 in place thereof. Since oven 71 is of a wholly conventional type, it has not been illustrated in detail.

A drawer 72 for utensils, pots, pans, etc., is also provided in this embodiment. Catch means including a clip 73 and bolt 74 are provided to hold drawer 72 closed whenever the cabinet is moved.

In all other respects, including the area beneath the sink, this embodiment is similar to that shown in FIGS. 1 and 2, and like parts are referred to by like numerals. However, the oven cover is shown in a closed position to indicate how it can provide a work area. In addition, dish rack 17 is shown hingedly connected to the forward edge of wall 41 to illustrate the manner in which it is mounted.

It is apparent from the above descriptions that the kitchen units of the invention are compact and completely self-contained, i.e., they do not rely on external connections whatsoever for their use. Desirably, lightweight materials such as light-weight metals, high density plastics, Fiberglas, wood and Formica are used in constructing both illustrated embodiments of the invention.

Many modifications of the invention are contemplated. For example, as mentioned before, the refrigeration means of FIG. 1 need not be an icebox, but could be a gas-powered or electric refrigerator. If it is gas-powered, another gas tank can be provided for the refrigerator, or gas tank 34 can supply gas both to the stove and refrigerator. If it is electrically powered, bucket 52 can be replaced with a battery or, if the kitchen unit is being used on or near a powered vehicle, connected by a cord to the vehicle battery, e.g., through a cigarette lighter.

What is claimed is:

1. In a self-contained and portable kitchen unit, a generally rectangular cabinet having a countertop, a sink in said countertop having a water faucet and a drain, a water supply tank contained within said cabinet beneath said sink and communicating with said faucet, a pump for pumping water from said supply tank through said faucet, a conduit for communicating the drain of said sink to the exterior of said cabinet, a door in said cabinet permitting access to the area beneath said sink and to said water supply tank, a stove unit mounted in said countertop, and means within said cabinet for supplying heat energy to said stove.

2. In a self-contained and portable kitchen unit, a generally rectangular cabinet having a countertop, a sink in said countertop having a water faucet and a drain, a water supply tank contained within said cabinet beneath said sink and communicating with said faucet, a pump for pumping water from said supply tank through said faucet, a waste water receiving means within said cabinet beneath said sink, a conduit for selectively communicating the drain of said sink with said waste water receiving means or the exterior of said cabinet, a door in said cabinet permitting access to the area beneath said sink and to said water supply tank and said waste water receiving means, a stove unit mounted in said countertop, and means within said cabinet for supplying heat energy to said stove.

3. A self-contained and portable kitchen unit comprising in combination a generally-rectangular cabinet having a countertop, a sink in said countertop having a water faucet and a drain, a water supply tank contained within said cabinet beneath said sink and communicating with said faucet, a pump for pumping water from said supply tank through said faucet, a conduit for communicating the drain of said sink to the exterior of said cabinet, a stove unit mounted in said countertop, a door in said cabinet permitting access to the area beneath said sink and to said water supply tank, means within said cabinet for supplying heat energy to said stove, and refrigeration means mounted in said cabinet beneath said stove unit.

4. A self-contained and portable kitchen unit comprising in combination a generally rectangular cabinet having a countertop, a sink in said countertop having a water faucet and a drain, a water supply tank contained within said cabinet beneath said sink and communicating through a hose with said faucet, a waste water receiving tank within said cabinet beneath said sink, a hose for selectively communicating the drain of said sink with said waste water receiving tank or the exterior of said cabinet, a stove unit mounted in said countertop, a gas tank having a combustible gas therein and communicating with the burners of said stove for supplying gas thereto, said gas tank being within said cabinet beneath said sink, a door in said cabinet permitting access to the area beneath said sink and to said water supply, waste water receiving and gas tanks, and refrigeration means mounted in said cabinet beneath said stove unit.

5. A self-contained kitchen unit according to claim 4 in which said refrigeration means is an icebox, and a bucket is provided within said cabinet beneath said sink for collecting run-off from said icebox.

6. In a self-contained and portable kitchen unit, a generally rectangular cabinet having a countertop with a sink molded therein having a water faucet and a drain, a water supply tank contained within said cabinet and communicating through a hose with said faucet, a waste water receiving tank within said cabinet, a hose connected to the drain of said sink for selectively communicating said drain with said waste water receiving tank or the exterior of said cabinet, a stove unit mounted in said countertop, a gas tank within said cabinet having a combustible gas therein and communicating with the burners of said stove unit for supplying gas thereto, and a door in said cabinet permitting access to said water supply, waste water receiving, and gas tanks.

7. A self-contained kitchen unit according to claim 6 wherein an oven is mounted in said cabinet, and said gas tank within said cabinet also supplies gas to said oven.

8. A self-contained and portable kitchen unit comprising in combination a generally rectangular cabinet having a countertop with a sink molded therein which has a water faucet and a drain, a water supply tank within said cabinet beneath said sink communicating through a hose with said faucet, a water pump for forcing water from said supply tank through said faucet, a waste water receiving tank removably positioned within said cabinet beneath said sink, a hose connected to the drain of said sink for selectively communicating said drain with said waste water receiving tank or the exterior of said cabinet, a stove unit mounted in said countertop having gas burners, a cover hingedly connected to the rear edge of said stove unit for covering said stove unit, said cover being movable to uncover said burners and form a hood thereabout, a combustible gas supply tank within said cabinet beneath said sink and communicating through a gas flow regulator with the burners of said stove unit to provide gas thereto, an icebox mounted within said cabinet beneath said stove unit, a bucket within said cabinet beneath said sink for collecting run-off from said icebox, and a door in said cabinet permitting access to the area beneath said sink and to said bucket, and said water supply, waste water receiving, and gas tanks.

9. A self-contained and portable kitchen unit comprising in combination a generally rectangular cabinet having a countertop with a sink molded therein which has a water faucet and a drain, a water supply tank contained within said cabinet beneath said sink and communicating with said faucet, a water pump for forcing water from said supply tank through said faucet, a waste water receiving tank removably positioned within said cabinet beneath said sink, a hose for selectively communicating the drain of said sink with said waste water receiving tank or the exterior of said cabinet, a stove unit mounted in said countertop having gas burners, a cover hingedly connected to the rear edge of said stove unit for covering said stove unit, said cover being movable to uncover said burners and form a hood thereabout, an oven mounted in said cabinet beneath said stove unit, a combustible gas supply tank within said cabinet beneath said sink and communicating through a flow regulator with the burners of said stove unit and the heating units of said oven, and a door in said cabinet permitting access to the area beneath said sink to said water supply, waste water receiving and gas tanks.

10. A self-contained and portable kitchen unit comprising a generally rectangular cabinet having a countertop, a sink formed in said countertop and having a water faucet and a drain; a water supply tank contained within said cabinet beneath said sink and communicating through a hose with said faucet, a pump for pumping water from said supply tank through said faucet, a conduit for communicating the drain of said sink to the exterior of said cabinet, a stove unit mounted in said countertop, means within said cabinet, beneath said sink to supply heat energy to said stove, said cabinet having a door on its front side to the area beneath said sink, said door being hingedly connected at its upper edge to said cabinet and having a leg pivotally connected to its interior surface adjacent its bottom edge to support said door in a horizontal position when said door is open to thereby provide a table.

11. The self-contained and portable kitchen unit of claim 10 wherein a dish rack is hingedly connected at a forward edge to the inner wall of said cabinet immediately behind said door so that said dish rack is pivotable outward when said door is open to facilitate access to said rack.

References Cited by the Examiner
UNITED STATES PATENTS

| | | |
|---|---|---|
| 863,981 | 8/1907 | Gerner. |
| 1,221,498 | 4/1917 | Zerse. |
| 1,318,229 | 10/1919 | Peters. |
| 1,937,900 | 12/1933 | Levy et al. _____ 296—23 |
| 2,178,411 | 10/1939 | Tietz. |
| 2,459,515 | 1/1949 | Flinner _____ 126—37 X |
| 2,867,471 | 1/1959 | Coon _____ 296—23 |

CHARLES J. MYHRE, *Primary Examiner.*